United States Patent
Mongrain (10) Patent No.: US 10,131,493 B2
(45) Date of Patent: Nov. 20, 2018

(54) HEADER FOR PACKAGING A ROLL OF PAPER

(71) Applicant: CASCADES CONVERSION INC., Kingsey Falls (CA)

(72) Inventor: Yvon Mongrain, Lanoraie (CA)

(73) Assignee: Cascades Sonoco Inc., Kingsey Falls, Quebec (CA)

(*) Notice: Subject to any disclaimer, the term of this patent is extended or adjusted under 35 U.S.C. 154(b) by 420 days.

(21) Appl. No.: 15/092,958

(22) Filed: Apr. 7, 2016

(65) Prior Publication Data

US 2016/0297603 A1  Oct. 13, 2016

Related U.S. Application Data

(60) Provisional application No. 62/143,989, filed on Apr. 7, 2015.

(30) Foreign Application Priority Data

May 29, 2015  (CA) ..................................... 2893396

(51) Int. Cl.
*B65D 85/672* (2006.01)
*B65B 11/00* (2006.01)
(Continued)

(52) U.S. Cl.
CPC ............ *B65D 85/672* (2013.01); *B32B 23/00* (2013.01); *B32B 27/10* (2013.01); *B32B 27/20* (2013.01);
(Continued)

(58) Field of Classification Search
CPC ..... B65D 85/672; B65D 65/24; B65B 11/004; B65B 25/148; B32B 23/00; B32B 27/10; B32B 27/20; B32B 27/26; B32B 27/327; B32B 29/002; B32B 29/005; B32B 2264/0228; B32B 2264/025; B32B 2264/102; B32B 2264/104;
(Continued)

(56) References Cited

U.S. PATENT DOCUMENTS 3,342,014 A  9/1967 Prager
4,716,709 A  1/1988 Lamb, Sr. et al.
(Continued)

FOREIGN PATENT DOCUMENTS

CA  2153394 C  11/2004
CA  2545432 C  7/2012
(Continued)

*Primary Examiner* — Michael C Miggins
(74) *Attorney, Agent, or Firm* — Eversheds Sutherland (US) LLP (57) ABSTRACT

There is provided a header for packaging a roll of paper having two opposite roll ends and an outer roll surface extending between the roll ends, the outer roll surface being wrapped with a wrapping paper. The header comprises a cellulosic fiber based substrate having two surfaces and a film coated to at least a portion of one of the substrate surfaces. The film is coated to the substrate surface by extrusion of a coating comprising a mLLDPE resin. The film coated surface is heat sealable to an outside surface of an interior header affixed to one of the roll ends, thereby forming a protective cap at the roll end. The header generates less volatile compounds and/or carbon monoxide compared to a header coated with a standard LDPE, on heat sealing conditions.

21 Claims, 6 Drawing Sheets

(51) Int. Cl.
*B65D 65/24* (2006.01)
*B32B 23/00* (2006.01)
*B65B 25/14* (2006.01)
*B32B 27/10* (2006.01)
*B32B 27/20* (2006.01)
*B32B 27/26* (2006.01)
*B32B 27/32* (2006.01)
*B32B 29/00* (2006.01)
*D21H 27/00* (2006.01)

(52) U.S. Cl.
CPC ............ *B32B 27/26* (2013.01); *B32B 27/327* (2013.01); *B32B 29/002* (2013.01); *B32B 29/005* (2013.01); *B65B 11/004* (2013.01); *B65B 25/148* (2013.01); *B65D 65/24* (2013.01); *D21H 1/00* (2013.01); *B32B 2264/025* (2013.01); *B32B 2264/0228* (2013.01); *B32B 2264/102* (2013.01); *B32B 2264/104* (2013.01); *B32B 2264/108* (2013.01); *B32B 2264/12* (2013.01); *B32B 2272/00* (2013.01); *B32B 2307/31* (2013.01); *B32B 2307/718* (2013.01); *B32B 2553/00* (2013.01)

(58) Field of Classification Search
CPC .......... B32B 2264/108; B32B 2264/12; B32B 2272/00; B32B 2307/31; B32B 2307/718; B32B 2553/00; D21H 1/00
See application file for complete search history.

(56) References Cited

U.S. PATENT DOCUMENTS

| | | |
|---|---|---|
| 4,820,374 A | 4/1989 | Lamb |
| 5,090,566 A | 2/1992 | Yount |
| 5,533,321 A | 7/1996 | Hooper et al. |
| 5,642,600 A | 7/1997 | Hooper et al. |
| 5,761,881 A | 6/1998 | Wall |
| 5,850,918 A | 12/1998 | Pienta |
| 6,114,456 A | 9/2000 | Dewart et al. |
| 6,186,326 B1 | 2/2001 | Pienta et al. |
| 6,446,804 B1 | 9/2002 | Lehtineva |
| 6,505,459 B1 | 1/2003 | Ruohio et al. |
| 7,404,485 B2 | 7/2008 | Uitenbroek |
| 7,913,895 B2 | 3/2011 | Bowden et al. |
| 7,956,129 B2 | 6/2011 | Chai |
| 8,342,388 B2 | 1/2013 | Labbe et al. |
| 2002/0033350 A1 | 3/2002 | Itkonen et al. |
| 2002/0050119 A1 | 5/2002 | Gatewood et al. |
| 2006/0277866 A1 | 12/2006 | Bowden et al. |
| 2007/0295628 A1 | 12/2007 | Uitenbroek |
| 2008/0148688 A1 | 6/2008 | Uitenbroek |
| 2008/0282649 A1 | 11/2008 | Uitenbroek |
| 2011/0127187 A1 | 6/2011 | Bowden et al. |
| 2012/0097564 A1 | 4/2012 | Bowden et al. |
| 2013/0008816 A1 | 1/2013 | Aumais et al. |
| 2013/0341225 A1 | 12/2013 | Risler et al. |
| 2014/0014711 A1 | 1/2014 | Jutras et al. |

FOREIGN PATENT DOCUMENTS

| | | |
|---|---|---|
| CA | 2639514 C | 1/2015 |
| EP | 2042434 A2 | 4/2009 |
| EP | 2075118 A1 | 7/2009 |
| GB | 1094805 A | 12/1967 |

Winding
FIG. 1A (Prior Art)

Wrapping
FIG. 1B (Prior Art)

Headers introduction
FIG. 1C (Prior Art)

Crimping
FIG. 1D (Prior Art)

Heat Sealing
FIG. 1E (Prior Art)

HEADER FOR PACKAGING A ROLL OF PAPER

TECHNICAL FIELD

The technical field relates to headers for packaging paper rolls. More particularly, it relates to film-coated headers as protective headers for wrapped paper rolls.

TECHNICAL BACKGROUND

Figure 1A:
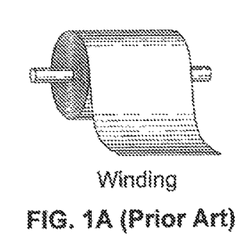
FIG. 1A shows a paper winding step.
Figure 1B:
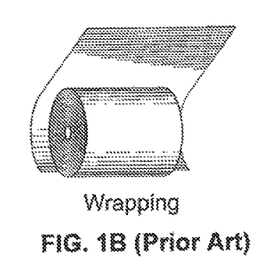
FIG. 1B shows a paper roll wrapping step.

Newsprint and other forms of paper are manufactured and processed as large elongated sheets or webs. As shown in FIG. 1 (Prior Art), for storage and transport, the paper stock is wrapped around a core to form a cylindrical roll, a step known as winding (FIG. 1A). To protect the roll and avoid spoilage of the paper, e.g. by the moisture, the atmosphere, and/or physical abrasions, the roll itself is wrapped in a protective wrapping (FIG. 1B) which can be moisture proof. Specialized machinery is employed to automatically apply the wrapper to the large rolls. Typically, the rolls are then stacked one on the other and stored on end.

Figure 1C:
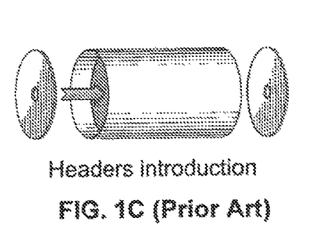
FIG. 1C shows inside headers introduction step.
Figure 1D:
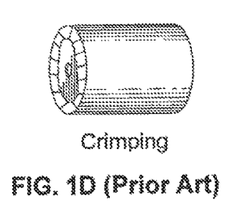
FIG. 1D shows a crimping step and FIG. 1E shows a heat sealing step with exterior headers.

Various methods have previously been used to wrap paper rolls. One of the most successful methods has been to first wrap the roll in one or two layers of a protective wrapper (FIG. 1B), with the wrapper extending outwardly beyond the ends of the roll. Next, interior roll headers (disks formed of corrugated board, chipboard, coated chipboard, laminated kraft paper or recycled paper) are fitted inside the wrapper against the ends of the roll (FIG. 1C). The wrapper is then crimped over the edges of the interior headers at the ends of the rolls using a crimping wheel or any other appropriate technique (FIG. 1D).

Figure 1E:
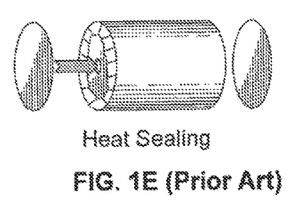

A set of exterior or outside roll headers (disks typically formed of a recycled paper or a kraft paper with a polymer coating on the inside surface) are then attached to the ends of the roll over the crimped edges (FIG. 1E). The headers and the wrapper are held in place and affixed to one another through the use of an adhesive, such as a heat-sensitive adhesive (a polymer coating), on the inside surface of the exterior roll header and/or the outward face of the interior roll header. The exterior roll headers are affixed to the ends of the rolls in a typical roll wrapping machine by applying heat and/or pressure in accordance with the properties of the adhesive used. To heat seal the headers, pressure and high temperature are usually necessary.

Standard polymer coating which are applied to the inside surface of the exterior headers include low density polyethylene (LDPE) coatings. Upon heat sealing these headers at high temperature, one can observe generation of toxic gas such as volatile organic compounds (VOCs) and carbon monoxide, which may raise safety and environmental concerns.

In view of the above, there is a need for headers for packaging paper rolls which would be able to overcome or at least minimize the above-discussed prior art concerns.

BRIEF SUMMARY

According to a general aspect, there is provided a header for packaging a roll of paper having two opposite roll ends and an outer roll surface extending between the roll ends, the outer roll surface being wrapped with a wrapping paper, wherein the header comprises a cellulosic fiber based substrate having two surfaces and a film coated to at least a portion of one of the surfaces of the cellulosic fiber substrate, wherein the film is coated to the substrate surface by extrusion of a coating comprising at least one metallocene linear low density polyethylene (mLLDPE) resin, and wherein the film coated surface is heat sealable to at least a portion of an outside surface of an interior header affixed to one of the roll ends, thereby forming a protective cap at the roll end.

In an optional aspect, the film coated surface of the header is heat sealable to crimps of wrapping paper formed at edges of the roll ends through wrapping of the outer roll surface with the wrapping paper.

In another optional aspect, the mLLDPE resin comprises a copolymer of ethylene and at least one $C_3$-$C_{10}$ α-olefin.

In another optional aspect, the mLLDPE resin comprises a copolymer of ethylene and propylene, a copolymer of ethylene and 1-butene, a copolymer of ethylene and 1-hexene, a copolymer of ethylene and 1-octene or any mixture thereof.

In another optional aspect, the mLLDPE resin comprises a copolymer of ethylene and 1-octene.

In another optional aspect, the mLLDPE resin has a density varying from 0.83 g/cm$^3$ to 0.97 g/cm$^3$, or a density varying from 0.90 g/cm$^3$ to 0.94 g/cm$^3$ or a density varying from 0.91 g/cm$^3$ to 0.93 g/cm$^3$.

In another optional aspect, the mLLDPE resin has a melt index (MI) varying from 0.1 g/10 min to 25 g/10 min, or a melt index (MI) varying from 0.5 g/10 min to 20 g/10 min, or a melt index (MI) varying from 0.9 g/10 min to 11 g/10 min. In another optional aspect, the mLLDPE resin has a melt index (MI) of 4.5 g/10 min.

In another optional aspect, the mLLDPE resin has a melting point varying from 100° C. to 180° C., or a melting point varying from 110° C. to 135° C., or a melting point varying from 120° C. to 125° C.

In another optional aspect, the mLLDPE resin has a density of 0.925 g/cm$^3$, a melt index of 4.5 g/10 min and a melting point of 122° C.

In another optional aspect, the mLLDPE resin has a polydispersity index (PDI) varying from 1 to 5, or a polydispersity index (PDI) varying from 1 to 4, or a polydispersity index (PDI) varying from 2 to 3, or a polydispersity index (PDI) varying from 2.5 to 2.6.

In another optional aspect, the coating comprises from about 10 wt % to 100 wt % of the mLLDPE resin. In another optional aspect, the mLLDPE resin is present in the coating in an amount of from about 10 wt % to about 85 wt % of the mLLDPE resin. The mLLDPE resin can be present in at least about 40 wt % in the coating. In another optional aspect, the coating comprises from about 40 wt % to about 85 wt % of the mLLDPE resin, or from about 50 wt % to about 70 wt % of the mLLDPE resin. In another optional aspect, the coating comprises about 60 wt % of the mLLDPE resin.

In another optional aspect, the coating comprises about 60 wt % of a mLLDPE resin having a melt index of 4.5, a density of 0.925 g/10 min, a number average molecular weight Mn of about 23,000, a weight average molecular weight Mw of about 60,000 and a higher average molecular weight Mz of about 115,000.

In another optional aspect, the coating further comprises at least one low density polyethylene (LDPE) resin.

In another optional aspect, the coating comprises from about 10 wt % to about 40 wt % of the LDPE resin, or from about 20 wt % to about 35 wt % of the LDPE resin.

In another optional aspect, the coating comprises about 60 wt % of a mLLDPE resin having a melt index of 4.5 and from about 30 wt % to about 33 wt % of the LDPE resin.

In another optional aspect, the coating further comprises an additive being calcium carbonate, titanium oxide (TiO$_2$), talc, clay, carbon black, ethylene vinyl acetate (EVA), ethylene methyl acrylate (EMA), ethylene acrylic acid (EAA) or any mixture thereof.

In another optional aspect, the coating comprises calcium carbonate as additive.

In another optional aspect, the coating comprises up to about 48 wt % calcium carbonate, or up to about 30 wt % calcium carbonate, or up to about 25 wt % calcium carbonate. In another optional aspect, the coating comprises from about 7.0 wt % to about 10 wt % calcium carbonate.

In another optional aspect, the coating also comprises at least one antioxidant. In an optional aspect, the antioxidant(s) are present in the mLLDPE resin.

In another optional aspect, the header comprises the film in a quantity of from about 10 g/m$^2$ to about 30 g/m$^2$, or in a quantity of from about 15 g/m$^2$ to about 20 g/m$^2$, or in a quantity of from about 16 g/m$^2$ to about 19 g/m$^2$. In another optional aspect, the film is in a quantity of about 18 g/m$^2$.

In another optional aspect, the header has the film coated to the whole surface of the cellulosic fiber based substrate.

In another optional aspect, the cellulosic fiber based substrate of the header has a substantially circular shape.

In another optional aspect, the cellulosic fiber based substrate of the header comprises a cardboard, a laminated paper, a virgin kraft liner, a recycled paper, a recycled liner, a recycled medium or any combination thereof.

In another optional aspect, the cellulosic fiber based substrate of the header comprises a recycled liner.

In another optional aspect, the cellulosic fiber based substrate of the header has a basis weight from about 50 g/m$^2$ to about 600 g/m$^2$, or a basis weight from about 115 g/m$^2$ to about 337 g/m$^2$, or a basis weight from about 200 g/m$^2$ to about 250 g/m$^2$. In another optional aspect, the cellulosic fiber based substrate of the header has a basis weight of about 205 g/m$^2$.

In another optional aspect, the cellulosic fiber based substrate comprises a cardboard, a laminated paper, a virgin kraft liner, a recycled paper, a recycled liner or a recycled medium, and has a basis weight from about 115 g/m$^2$ to about 337 g/m$^2$.

In another optional aspect, the cellulosic fiber based substrate comprises a recycled liner having a substantially circular shape, the film being coated to the whole surface of the cellulosic fiber based substrate.

In another optional aspect, the header is characterized in that under heat sealing conditions, the header generates lower quantities of volatile organic compounds (VOCs) and/or carbon monoxide compared to a header coated with a conventional LDPE based film. In another optional aspect, the VOCs comprise aldehydes.

In another optional aspect, the header is characterized in that under heat sealing conditions, the header generates lower quantities of carbon monoxide and/or VOCs compared to a header coated with a film comprising LDPE and which is mLLDPE-free. In another optional aspect, the VOCs comprise aldehydes.

According to another aspect, there is provided a use of the header as defined herein, for packaging a roll of paper.

According to another aspect, there is provided a use of the header as defined herein, to protect the ends of a roll of paper.

According to another aspect, there is provided a wrapped paper roll, comprising:

a paper roll having two spaced-apart roll ends and an outer roll surface extending between the roll ends;

two interior headers, each one of the interior headers being affixed to one of the roll ends;

a wrapping paper covering the outer roll surface and being crimped over the edges of the interior headers at the ends of the rolls; and two exterior headers, each one of the exterior headers being heat sealed to a respective interior header and corresponding to a header as defined herein.

According to another aspect, there is provided a method for wrapping a paper roll having a pair of spaced-apart roll ends and an outer roll surface extending between the roll ends, comprising:

providing a wrapping paper;

wrapping the outer roll surface with the wrapping paper, the wrapping paper extending outwardly beyond the ends of the roll;

fitting an interior header at each one of the roll ends;

crimping the wrapping paper over an edge of each one of the interior headers at the ends of the roll; and heat sealing a header as defined herein at each one of roll ends.

Other objects, advantages and features will become more apparent upon reading of the following non-restrictive description of embodiments thereof, with reference to the accompanying drawings.

BRIEF DESCRIPTION OF THE DRAWINGS

FIG. 1 (Prior Art) comprises FIG. 1A to FIG. 1E.

DETAILED DESCRIPTION

A header according to one embodiment will now be described. The header is useful for packaging a roll of paper having two opposite roll ends and an outer roll surface extending between the roll ends. Usually, the outer roll surface is wrapped with a wrapping paper to protect the paper from external damages. The header further provides protection at the ends of the paper roll. As described above, a header can be heat sealed at each end of the paper roll thereby forming protective caps against the elements during transport and/or storage of the paper roll.

Figure 2:
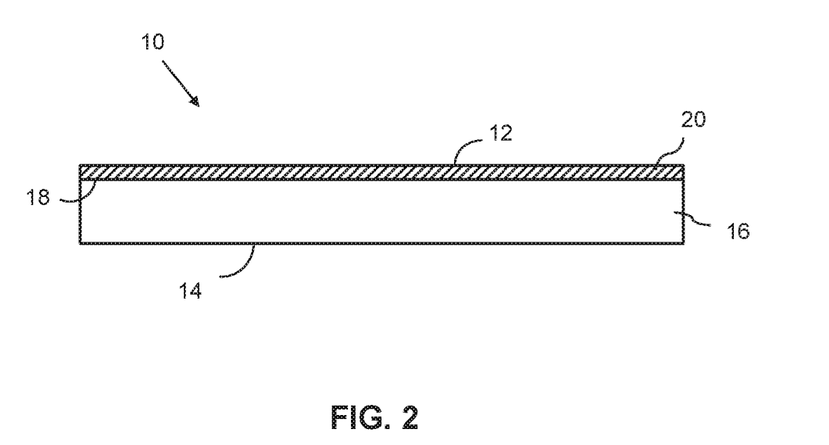
FIG. 2 is a cross-sectional view of a header according to one embodiment.

Referring to FIG. 2, the header 10 comprises an outside surface 14 and an inside surface 12. It is made of a cellulosic fiber based substrate 16 having two surfaces. An external surface of the cellulosic fiber based substrate can correspond to the outside surface 14 of the header. However, in one optional embodiment, the external surface of the cellulosic fiber based substrate could be recovered with a coating, such as an anti-slip coating for instance (not shown in the figures). When the outside surface of the header comprises an anti-slip coating, this allows limiting or avoiding the rolls being stacked on top of each other to slip, rendering safer their storage. The other surface 18 of the substrate 16, i.e. the internal surface, is coated with a film 20 on at least a portion thereof. In one embodiment, the whole internal surface 18 of the substrate is coated with the film 20. As such, and as can be seen in FIG. 2, the inside surface 12 of the header 10 can correspond to the film coated surface of the substrate.

In one embodiment, the cellulosic fiber-based substrate can be any suitable wood-fiber based material, such as a cardboard, a laminated paper, a virgin kraft liner, a recycled paper, a recycled liner, a recycled medium or any combination thereof. In some embodiments, the cellulosic fiber based substrate can be a recycled liner. In particular, the cellulosic fiber based substrate can have a substantially circular shape, with a size adapted to the size of the roll ends. For example, the substrate can have a circular surface having a diameter close or equal to the width of the roll ends.

In another embodiment, the cellulosic fiber based substrate can have a basis weight from about 50 g/m² to about 600 g/m², or from about 115 g/m² to about 337 g/m², or from about 200 g/m² to about 250 g/m². In a particular embodiment, the cellulosic fiber based substrate can have a basis weight of about 205 g/m².

The term "about" as used in the present disclosure means within an acceptable error range for the particular value as determined by one of ordinary skill in the art, which will depend in part on how the value is measured or determined, i.e. the limitations of the measurement system. It is commonly accepted that a 10% precision measure is acceptable and encompasses the term "about".

As previously explained, when the paper roll is wrapped for transport and/or storage, interior headers are generally affixed to the roll ends, and then, the wrapping paper is crimped over the edges of the interior headers at the ends of the rolls. It is then possible to further heat seal headers such as header 10 at each end of the paper roll for further protection. In order to be able to heat seal the header 10, the film 20 coated onto the internal substrate surface 18 must have heat sealable characteristics. While it is known in the field to use polyethylene resins such as low density polyethylene (LDPE) resins to form heat sealing films, this type of resins may generate toxic gas, such as VOCs and carbon monoxide under heat sealing conditions. More particularly, aldehydes may be generated during the heat sealing step and this raises safety and environmental concerns. The present header 10 comprises a heat sealable film 20 which can at least decrease the emission of certain toxic gas during the heat sealing step.

In the present embodiment, the heat sealable film 20 is obtained by extruding a coating comprising at least one metallocene linear low density polyethylene (mLLDPE) resin on the internal surface 18 of the substrate.

In one embodiment, the present header which includes a surface coated with the film made of at least one metallocene linear low density polyethylene (mLLDPE) resin, is characterized in that under heat sealing conditions, the header generates lower quantities of carbon monoxide and/or volatile organic compounds (VOCs) such as aldehydes, compared to a header coated with a conventional LDPE based film, e.g. a film comprising at least about 90 wt % LDPE and calcium carbonate. In another embodiment, the header is characterized in that under heat sealing conditions, the header generates lower quantities of carbon monoxide and/ or VOCs (e.g. aldehydes), compared to a header coated with a film comprising LDPE and which is mLLDPE-free.

The mLLDPE resin is a LLDPE resin which can be produced by the single site or Ziegler-Natta catalysis process using metallocene catalysts. Metallocene single-site catalysts are transition metal compounds that contain cyclopentadienyl (Cp) or Cp derivative ligands. In one embodiment, the mLLDPE can be a copolymer of ethylene with one or more $C_3$-$C_{10}$ α-olefins. In another embodiment, the mLLDPE can be a copolymer of ethylene with an α-olefin including propylene, 1-butene, 1-pentene, 1-hexene, or 1-octene, or mixtures thereof. In one embodiment, the mLLDPE is a copolymer of ethylene with 1-octene.

In another embodiment, the mLLDPE resin used in the coating forming the heat sealable film can have a density varying from 0.83 g/cm³ to 0.97 g/cm³. The density which is sometimes also referred to as specific gravity can be determined according to test method ASTM D792. In some embodiments, the density of the mLLDPE resin can vary from 0.90 g/cm³ to 0.94 g/cm³ or from 0.91 g/cm³ to 0.93 g/cm³.

In a further embodiment, the mLLDPE resin can have a melt index (MI) varying from 0.1 g/10 min to 25 g/10 min. The melt index also commonly named melt-flow index (MFI) or the melt-flow rate or mass-flow rate (MFR) can be determined using the melt-flow test detailed in the ASTM D1238 standard. The method uses a melt indexer which consists of a heated barrel and piston assembly to contain a sample of the resin. A specified load (weight) is applied to the piston, and the melted polymer is extruded through a capillary die of specific dimensions. The mass of resin, in grams, that is extruded in 10 minutes equals the MI, expressed in units of g/10 min. In another embodiment, the mLLDPE resin has a melt index (MI) varying from 0.5 g/10 min to 20 g/10 min, or varying from 0.9 g/10 min to 11 g/10 min. In a further embodiment, the mLLDPE resin can have a melt index (MI) of 4.5 g/10 min.

In another embodiment, the mLLDPE resin can also be characterized by a melting point varying from 100° C. to 180° C., or from 110° C. to 135° C., or from 120° C. to 125° C.

In one embodiment, the heat sealable film can be obtained from a coating comprising a mLLDPE resin having a density of 0.925 g/cm³, a melt index of 4.5 g/10 min and a melting point of 122° C.

In another embodiment, the mLLDPE resin used in the coating making up the heat sealable film of the present header, can be characterized by a polydispersity index (PDI) varying from 1.5 to 5, or from 1.5 to 4, or from 2 to 3. Other examples of mLLDPE resin can have a polydispersity index (PDI) varying from 2.5 to 2.6. The polydispersity index measures the broadness of the molecular weight distribution of the polymeric resin and is defined as the ratio Mw/Mn where Mn is the number average molecular weight of the polymer and Mw its weight average molecular weight. It can be measured by gel permeation chromatography (GPC). The mLLDPE resin of the present header has a relatively narrow molecular weight distribution such that the low molecular weight tail is decreased or eliminated.

In a further embodiment, the coating can comprise one or more antioxidant additives. The antioxidant(s) can be present in the mLLDPE resin or added separately to the coating. In some embodiments, the antioxidant can be added to the coating as a masterbatch with other additives, such as calcium carbonate for instance. The presence of the antioxidant(s) allows to further protecting the mLLDPE from degradation upon heating, such as during extrusion thereof on the cellulosic fiber based substrate.

The choice of antioxidant additives can be optimized upon the temperature of use and final requirement. Antioxidants are generally classified into three types:

Primary: organic molecules consisting of hindered phenol and amine derivatives; generally, the higher the molecular weight of the additive, the better the performance;

Secondary: organic molecules consisting of phosphates and lower molecular weight hindered phenols; generally, the lower the molecular weight, the better the performance;

Thioesters: organic molecules containing sulfur which have a cooperating (synergistic or additive) effect when added with a primary A/0.

A person skilled in the art would know which antioxidants to choose to reach the best performance. Secondary antioxidants which are usually added to provide processing stability during pelletization and extrusion/molding processes could particularly be suitable.

Other examples of antioxidants can include phosphite, hydroxylamine, lactone or Vitamine E.

The dosage of each antioxidant may vary on the level of protection required and could also be a blend of different antioxidants.

Many mLLDPE resins suitable for use in the coating used to make the heat sealable film on the cellulosic fiber based substrate are commercially available. Examples include the product EC045D from Kolm Polymers Ltd., the products AFFINITY™ PT 1450G1 and ELITE™ 581 from Dow Chemical Company, the products mPACT® D163 and MarFlex® D350 from Chevron Philips Chemical Company, the product ECD703 from ExxonMobil Chemical or the product Evolue™ SP1071C from Prime Polymer Co., Ltd. These products can be used alone or in combinations.

In another embodiment, the coating which is used to make up the heat sealable film of the present header can comprise from about 10 wt % to about 100% of the mLLDPE resin. In one embodiment, the coating can comprise from about 10 wt % to about 85 wt %. In another embodiment, the coating comprises at least about 40 wt % of the mLLDPE resin, or from about 40 wt % to about 85 wt %, or from about 50 wt % to about 70 wt % of the mLLDPE resin. An example of the coating can comprise about 60 wt % of the mLLDPE resin. The weight percentages (wt %) of the mLLDPE are weight percentages based on the total weight of the coating.

In a specific embodiment, the coating can comprise about 60 wt % of a mLLDPE resin having a melt index of 4.5, a density of 0.925 g/10 min, a number average molecular weight Mn of about 23,000, a weight average molecular weight Mw of about 60,000 and a higher average molecular weight Mz of about 115,000.

In another embodiment, the coating used to make the film on the surface of the cellulosic fiber based substrate may comprise at least one low density polyethylene (LDPE) resin. Conventional LDPE resins usually used in the field are suitable for being blended with the mLLDPE resin.

The use of the LDPE resin in the coating can allow decreasing the viscosity of the coating and therefore facilitate extrusion thereof in some types of extruder. The quantity of LDPE resin, when present in the coating, can thus vary depending on the type of extruder, which is used to apply the coating to the cellulosic fiber based substrate, but it can also depend on other parameters. For example, the quantity of LDPE to use in the coating could be adapted in view of the melt index of the mLLDPE. In one embodiment, less LDPE would be required if the melt index of the mLLDPE is high. A person skilled in the field will be able to determine the quantity of LDPE to use in combination with the mLLDPE, if required.

In some embodiments, if a LDPE resin is added to the coating, it can be present in the coating in an amount varying from about 10 wt % to about 40 wt %, or from about 20 wt % to about 35 wt % of the LDPE resin. In another embodiment, the coating can comprise about 60 wt % of a mLLDPE resin having a melt index of 4.5 and from about 30 wt % to about 33 wt % of LDPE resin. The weight percentages (wt %) of the mLLDPE and the LDPE are weight percentages based on the total weight of the coating.

In another embodiment, the coating which is applied to the cellulosic fiber based substrate can comprise at least one further additive to enhance the heat sealable properties of the film. The person skilled in the art will know which type of additives to use. Examples of such additives include calcium carbonate, titanium oxide ($TiO_2$), talc, clay, carbon black, ethylene vinyl acetate (EVA), ethylene methyl acrylate (EMA), ethylene acrylic acid (EAA) or any mixture thereof. These additives can be blended with the mLLDPE resin and the LDPE resin when present, and the mixture can be extruded to form the film onto the substrate surface. In some embodiments, the additives are provided as a masterbatch additive/LDPE resin, where the LDPE resin in the masterbatch can be the same or different from the LDPE resin which is present in the coating, for example to decrease the coating viscosity.

In a particular embodiment, the additive can be calcium carbonate, which can be present in the coating in an amount up to about 48 wt % calcium carbonate, or up to about 30 wt % calcium carbonate, or up to about 25 wt % calcium carbonate. In another embodiment, the coating can comprise from about 7 wt % to about 10 wt % calcium carbonate. The weight percentages (wt %) of the calcium carbonate additive are weight percentages based on the total weight of the coating.

The above-described coating can be applied to the cellulosic fiber based substrate using an extrusion process. In one embodiment, the mLLDPE resin, eventually pre-mixed with the LDPE resin and/or the additive such as calcium carbonate (or a masterbatch calcium carbonate-LDPE resin), in the form of granules, is provided to the extruder. Alternatively, the granules of each of the constituents of the coating can be provided separately to the extruder. In the extruder screw, the granules are then heated to allow melting thereof thereby forming a "liquid", somewhat viscous, coating which can then be extruded as a film through a die or extrusion head, to the surface of the cellulosic fiber based substrate. Another possible extrusion process utilizes two or more extruders to melt and deliver two or more constituents of the coating to a single extrusion head (die) which will extrude the coating as a film to the substrate surface. The heating temperature in the extruder is determined by the nature of the coating constituents and their melting temperature. A person skilled in the art will be able to determine the conditions to obtain a good quality film at the exit of the extrusion head.

The extrusion process can allow obtaining a thin film at the surface of the cellulosic fiber based substrate. In one embodiment, the quantity (basis weight) of the film can vary from about 10 g/m² to about 30 g/m², or from about 15 g/m² to about 20 g/m², or from about 16 g/m² to about 19 g/m². In a particular embodiment, the header includes a film in a quantity of about 18 g/m².

The above described mLLDPE containing film once coated to the surface of the cellulosic fiber based substrate provides interesting properties to the header made therefrom. These properties include for example:

good heat sealability at equal or lower temperature than the temperature required to heat seal a header coated with a film made of conventional LDPE resin, heat sealability which is as good or better than the heat sealability of a header coated with a conventional LDPE resin, less degradation of the film compared to a conventional LDPE resin containing film in the same heat sealing conditions, less emission of toxic gas such as aldehydes, compared to a conventional LDPE resin containing film in the same heat sealing conditions.

The header as defined according to the above embodiments is useful for packaging a roll of paper and provides further protection to the wrapped paper roll upon transport and/or storage thereof.

A method for wrapping a paper roll using a header as defined above will now be described. In a first step, the outer roll surface is wrapped with a wrapping paper. The width of the wrapping paper is generally larger than the roll width and a strip of wrapping paper is allowed to extend outwardly beyond each one of the roll ends. Then, an interior header is affixed to each one of the roll ends. The strips of wrapping paper are then crimped over the edges of the interior headers at the ends of the roll. Finally, a header as defined in the present disclosure is heat sealed at each one of roll ends, over the outside surface of the interior header. The heat sealing step takes place in between two heated platens typically heated from 325° F. to 450° F. (about 163° C. to about 232° C.). The outside heads are placed onto the vertical heated platens and retained in this position by suction allowed by perforations into the heated platen through which air can flow. The outside heads are allowed to stay in this position typically between 6-30 seconds. This step is typically known as pre-heating or activation step. Once the activation dwell time is over, the heated platens with the outside heads maintained in place start to move towards the roll and ultimately squeeze the roll at both roll ends for a typical dwell time of 6-60 seconds with a pressure ranging between 1-20 psi, typically ranging between 2-6 psi. This entire process is commonly known as a wrap line. Several types of equipment well known in the field can be used to implement the above described wrapping process.

The wrapped paper roll resulting from the wrapping method described above thus comprises: a paper roll; an interior header affixed to each one of the roll ends; a wrapping paper covering the outer surface of the roll and crimped over the edges of the interior headers at the ends of the rolls; and an exterior header as defined in the present disclosure heat sealed to a respective interior header. With this configuration, the paper roll can be safely and protectively packaged. It can then be transported and stored until utilization thereof, while ensuring that it will not be damaged by external elements.

The following examples are provided to illustrate some properties and advantages of the coating.

EXAMPLES

In the following examples, a header according to one particular embodiment, referred to as "Header Example", was tested for its heat sealing properties. The concentration of toxic gas generated at heat sealing conditions was also measured.

The Header Example was prepared by extruding to the surface of a recycled liner (basis weight 200.2 g/m²) a film comprising 60 wt % mLLDPE, 30 wt % LDPE (Dow™ LDPE 722, MI=8 g/10 min; density=0.918 g/cm³, melting point=107° C.) and 10 wt % of a masterbatch CaCO₃/LDPE at 75 wt % CaCO₃/25 wt % LDPE (melting point=105.6° C., MI=7.2 g/10 min). The film basis weight was 19 g/m².

The mLLDPE was the product EC045D from Kolm Polymers Ltd. and had the following characteristics:

density: 0.925
Melt index: 4.5
Melting point: 122° C.
Mn: 23,000
Mw: 60,000
Mz: 115,000
PDI: 2.6.

Example 1

Heat Sealing Properties

Three trials were performed under the conditions summarized in Table 1. The heat sealing properties of the Header Example was assessed visually by comparing its adhesiveness to the adhesiveness of a standard polymeric coated header (header coated with a film at about 93 wt % LDPE and about 7 wt % CaCO₃).

TABLE 1

|  | TRIAL 1 | TRIAL 2 | TRIAL 3 |
|---|---|---|---|
| Substrate basis weight (g/m²) | 335 | 269 | 269 |
| Heat sealing conditions | 15 seconds per cycle including 6 seconds of pressing fully automated robotic line | 30 seconds per cycle including 6 seconds of pressing not fully automated line; header handled by man | 1-24 seconds per cycle including 4 seconds of pressing fully automated robotic line |
| Heated platens temperature (° C.) | 200° C. | 198° C. & 155° C.* | 205° C. |
| Heated platen pressure (° C.) | unknown | Unknown | 3000 psi |

*One platen was at 198° C. and the other at 155° C.

For each one of Trials 1 to 3, no difference was observed between the adhesiveness of the Header Example and the standard polymeric header. Thus, Header Example shows adhesion properties as good as for standard polymeric header.

Example 2

Analysis of Toxic Gas

The concentration of toxic gas generated under heat sealing conditions (at 400° F., i.e. about 205° C.) was measured for the Header Example as described in Example 1, and compared with the three other different header samples described in Table 2 below.

TABLE 2

|  | Comparative Header 1 | Comparative Header 2 | Comparative Header 3 |
|---|---|---|---|
| Nature of the substrate and basis weight (g/m$^2$) | recycled liner 224.6 | recycled liner 323.3 | recycled liner 240.5 |
| Nature of the polymeric film | 93 wt % LDPE + 7 wt % CaCO$_3$ | 90 wt % LDPE + 10 wt % CaCO$_3$ | 90 wt % LDPE + 10 wt % CaCO$_3$ |
| Quantity of polymeric film (g/m$^2$) | 23.5 | 24.4 | 23.1 |

The measures were carried out following section V (Air quality) of the "Règlement sur la santé et la sécurité du travail" (Occupational Health and Safety Regulation) from the Government of Québec.

The following contaminants were sampled:

aldehydes using an Orbo 23 Spelco 2Q257™;

total volatile organic compounds (total VOC) using a Photolonization Detector (PID) from the company BW, model GasAlertMicro 5 PID™ (10.6 ev lamp);

carbon monoxide using a Photolonization Detector (PID) from the company BW, model Micro 5 PID™ (10.6 ev lamp).

In order to reproduce the gas generated during heat sealing of the roll headers, an experimental installation was mounted to test each sample under controlled conditions. Each roll header sample (100 cm$^2$) was placed on a heating plate with the polyethylene coated surface positioned upward. A metallic cone having a diameter smaller than the diameter of the sample was then positioned over the coated surface. The cone was used as a smokestack in order to contain the gas emissions in a single point. The VOCs and carbon monoxide at the smokestack exit were first measured using a GasAlertMicro 5 PID™. These measurements showed that heating the samples for a period of about 6 minutes was enough to generate the gas. Then, the testing was performed again but using a media specific to the capture of aldehydes (tube Orbo 23 Spelco 20257™).

Figure 3:
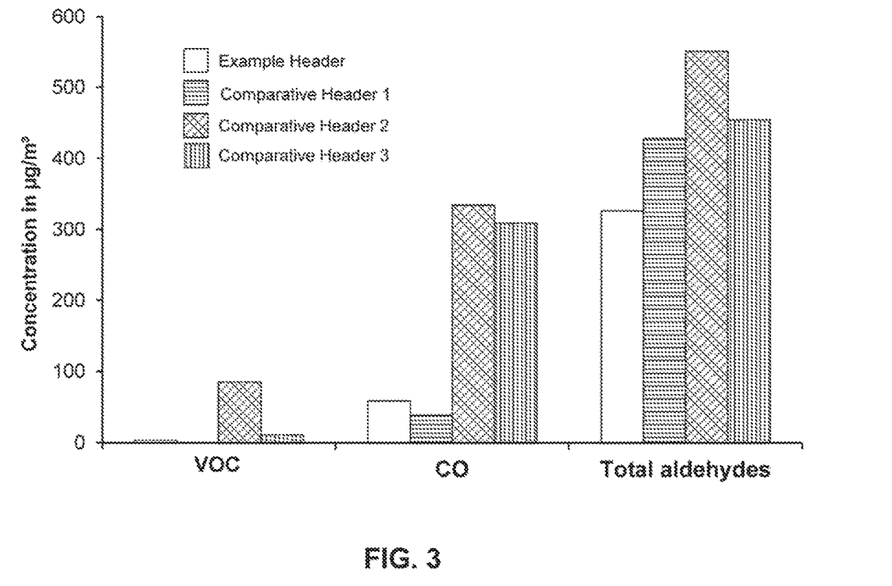
FIG. 3 is a diagram showing the concentration of toxic gas (total VOCs, carbon monoxide and total aldehydes) generated under heat sealing conditions for a header according to one embodiment in comparison with standard LDPE coated headers.

The results are reported in FIG. 3. As can be seen, the Header Example generates carbon monoxide in quantities of the same order than Comparative Header 1, but much less than Comparative Headers 2 and 3. The concentration of total aldehydes generated from Header Example is about 330-340 μg/m$^3$ and significantly less than the concentration of aldehydes generated from Comparative Headers 1, 2 and 3, with respective concentrations of about 440, 575 and 470 μg/m$^3$.

Example 3

Analysis of Toxic Gas

The concentration of toxic gas generated under heat sealing conditions was measured for the Header Example as described in Example 1, and compared with a fourth comparative header sample (Comparative Header 4). More particularly, the generation of VOCs, total aldehydes and carbon monoxide was measured after exposition of the headers at different times, at 220° C. The composition of Comparative Header 4 is described in Table 3 below

TABLE 3

| Comparative Header 4 | |
|---|---|
| Nature of the substrate and basis weight (g/m$^2$) | recycled liner 224.0 |
| Nature of the polymeric film | 90 wt % LDPE + 10 wt % CaCO$_3$ |
| Quantity of polymeric film (g/m$^2$) | 23.8 |

The measures of the generation of the gas were carried out as described in Example 2. The results are reported in FIGS. 4 to 6.

Figure 4:
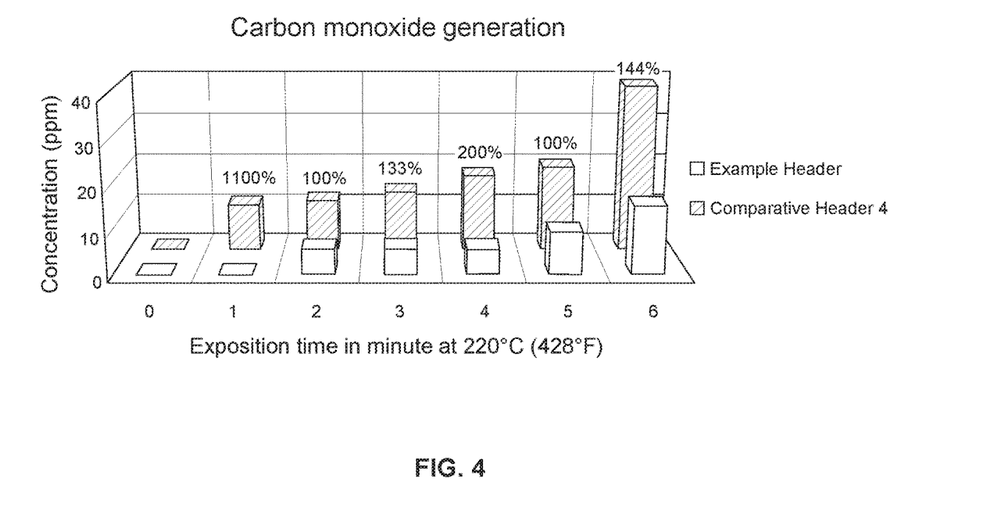
FIG. 4 is a diagram showing the concentration of carbon monoxide generated at different exposition times at 220° C. for a header according to one embodiment in comparison with a standard LDPE coated header.

As can be seen from the results reported in FIG. 4, the Header Example is 11 times better than Comparative Header 4 on carbon monoxide generation after 1 minute at 220° C. Example Header is still better than Comparative Header 4 after 6 minutes exposition time.

Figure 5:
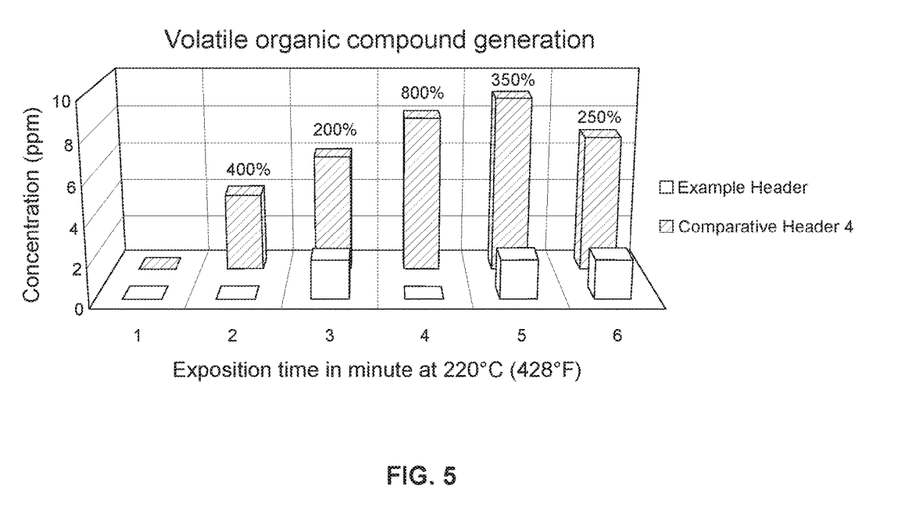
FIG. 5 is a diagram showing the concentration of VOCs generated at different exposition times at 220° C. for a header according to one embodiment in comparison with a standard LDPE coated header.

As can be seen from the results reported in FIG. 5, the Header Example is 5 times better than Comparative Header 4 on VOCs generation after 2 minutes at 220° C. Example Header is still better than Comparative Header 4 after 6 minutes exposition time.

Figure 6:
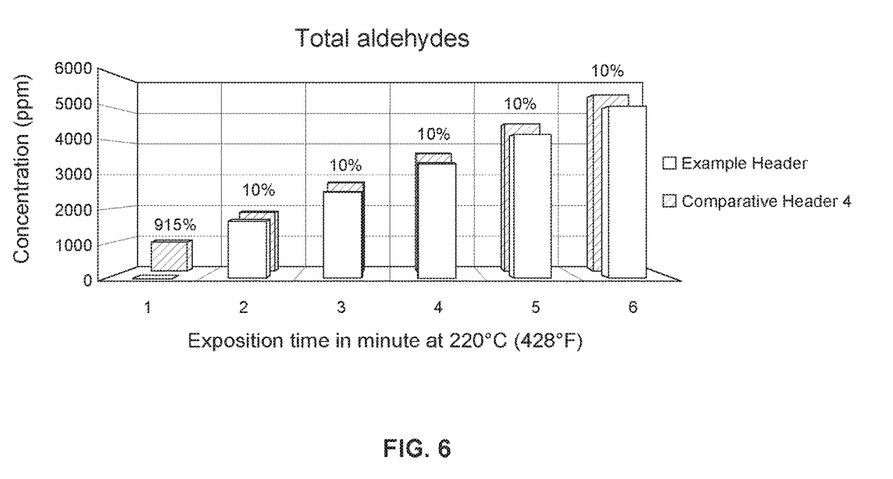
FIG. 6 is a diagram showing the concentration of total aldehydes generated at different exposition times at 220° C. for a header according to one embodiment in comparison with a standard LDPE coated header.

As can be seen from the results reported in FIG. 6, the Header Example did not generate aldehyde after 1 minute exposition and is 10% better than Comparative Header 4 on aldehydes generation above 1 minute at 220° C.

Example 4

Oxidative Induction Time (OIT) Measurement

The degradation of different polyethylenes, LDPE, LLDPE, and HDPE, with and without antioxidants and at different oxygen concentrations in the polymer granulates is well known in extrusion coating processing. Degradation can be studied using on line Rheometry, Size Exclusion Chromatography, Surface Oxidation Index measurements and GC-MS Chromatography. Degradation usually starts in the extruder where primary radicals are formed and are subject to auto-oxidation when oxygen is present. In the extruder, cross-linking and chain scission reactions dominate at low and high melt temperatures, respectively, for LDPE, and chain scission is overall dominating for the more linear LLDPE and HDPE resins. Additives such as antioxidants react with primary radicals formed in the melt. Degradation taking place in the film between the die orifice and the quenching point is mainly related to the exposure time to oxygen from air. Melt temperatures above 280° C. give a dominating surface oxidation, which increases with the exposure time to air between die orifice and quenching. A number of degradation products are identified, for example, aldehydes, volatile organic compounds, carbon monoxide and organic acids, which are present in homologous series.

The Oxidative Induction Time (OIT) of the mLLDPE used in Header Example as described in Example 1 (product EC045D from Kolm Polymers Ltd) was measured and compared to the OIT of a standard LDPE (5 MI, 0.924 g/cc). OIT was measured as the amount of time before the onset of degradation as measured by DSC. The standard method uses an elevated temperature and simply measures the time delay before the onset of degradation (OIT at Isothermal temperature). An alternate method uses a ramped temperature profile (Temperature Ramp OIT) rather than a constant temperature. This second method sometimes provides a more reproducible value especially in cases where the onset of oxidation is slow. The heating rate used in the Temperature Ramp OIT was 2° C./min. The results are reported in Table 4 below.

TABLE 4

| | LDPE | mLLDPE Header Example | |
| --- | --- | --- | --- |
| | 5 Ml, 0.924 g/cc | Sample 1 | Sample 2 |
| OIT at Isothermal temperature | | | |
| Average OITime (min) | 0.6 | 66.8 | 43.9 |
| OI Temp - Air (° C.) | 200 | 200 | 200 |
| Temperature Ramp OIT | | | |
| OI Time (min) | 19.8 | 36.8 | 33.7 |
| OI Temp (° C.) | 189 | 223 | 217 |

As shown in Table 4, the mLLDPE has a much better performance on the OIT results. In fact, the OIT obtained at 200° C. (Isothermal temperature) were of 66.8 and 43.8 minutes for mLLDPE vs LDPE at 0.6. It also shows better results for the temperature ramp OIT dynamic results.

This difference in performance can be explained by the following two main reasons:

1) Less lower molecular weight chains into the mLLDPE. Shorter chains degrade faster than longer chains at 200° C.
2) The antioxidant additives used in the product EC045D also protect the mLLDPE from degradation.

The choice of antioxidant additives can be optimized upon the temperature of use and final requirement. Antioxidants are generally classified into three types:

Primary: organic molecules consisting of hindered phenol and amine derivatives; generally, the higher the molecular weight of the additive, the better the performance;

Secondary: organic molecules consisting of phosphates and lower molecular weight hindered phenols; generally, the lower the molecular weight, the better the performance;

Thioesters: organic molecules containing sulfur which have a cooperating (synergistic or additive) effect when added with a primary A/0.

A person skilled in the art would know which antioxidants to choose to reach the best performance. Secondary antioxidants which are usually added to provide processing stability during pelletization and extrusion/molding processes could particularly be suitable.

The dosage of each antioxidant may vary on the level of protection required and could also be a blend of different antioxidants.

The results presented in the above examples confirm that the mLLDPE containing Example Header is a better candidate in terms of environmental and safety concerns, while providing good adhesion properties.

The above-described embodiments and examples are considered in all respect only as illustrative and not restrictive, and the present application is intended to cover any adaptations or variations thereof, as apparent to a person skilled in the art. Of course, numerous other modifications could be made to the above-described embodiments, as apparent to a person skilled in the art.

The invention claimed is:

1. A header for packaging a roll of paper having two opposite roll ends and an outer roll surface extending between the roll ends, the outer roll surface being wrapped with a wrapping paper, wherein the header comprises a cellulosic fiber based substrate having two surfaces and a film coated to at least a portion of one of the surfaces of the cellulosic fiber substrate, wherein the film is coated to the substrate surface by extrusion of a coating comprising at least one metallocene linear low density polyethylene (mLLDPE) resin, and wherein the film coated surface is heat sealable to at least a portion of an outside surface of an interior header affixed to one of the roll ends, thereby forming a protective cap at the roll end.

2. The header of claim 1, wherein the film coated surface is further heat sealable to crimps of wrapping paper formed at edges of the roll ends through wrapping of the outer roll surface with the wrapping paper.

3. The header of claim 1, wherein the mLLDPE resin comprises a copolymer of ethylene and at least one $C_3$-$C_{10}$ α-olefin.

4. The header of claim 1, wherein the mLLDPE resin comprises a copolymer of ethylene and propylene, a copolymer of ethylene and 1-butene, a copolymer of ethylene and 1-hexene, a copolymer of ethylene and 1-octene or any mixture thereof.

5. The header of claim 1, wherein the mLLDPE resin comprises a copolymer of ethylene and 1-octene.

6. The header of claim 1, wherein the mLLDPE resin has a melt index (MI) varying from 0.1 g/10 min to 25 g/10 min.

7. The header of claim 1, wherein the mLLDPE resin has a melt index (MI) varying from 0.9 g/10 min to 11 g/10 min.

8. The header of claim 1, wherein the mLLDPE resin has a polydispersity index (PDI) varying from 1 to 5.

9. The header of claim 1, wherein the coating comprises at least 40 wt % of the mLLDPE resin.

10. The header of claim 1, wherein the coating comprises about 60 wt % of a mLLDPE resin having a melt index of 4.5, a density of 0.925 g/10 min, a number average molecular weight Mn of about 23,000, a weight average molecular weight Mw of about 60,000 and a higher average molecular weight Mz of about 115,000.

11. The header of claim 1, wherein the coating further comprises an additive being calcium carbonate, titanium oxide ($TiO_2$), talc, clay, carbon black, ethylene vinyl acetate (EVA), ethylene methyl acrylate (EMA), ethylene acrylic acid (EAA) or any mixture thereof.

12. The header of claim 1, wherein the coating further comprises up to about 48 wt % calcium carbonate.

13. The header of claim 1, wherein the mLLDPE resin further comprises an antioxidant.

14. The header of claim 1, wherein the film is in a quantity of from about 10 g/m² to about 30 g/m².

15. The header of claim 1, wherein the cellulosic fiber based substrate comprises a cardboard, a laminated paper, a virgin kraft liner, a recycled paper, a recycled liner or a recycled medium, and the cellulosic fiber based substrate has a basis weight from about 115 g/m² to about 337 g/m².

16. The header of claim 1, wherein the cellulosic fiber based substrate comprises a recycled liner having a substantially circular shape, the film being coated to the whole surface of the cellulosic fiber based substrate.

17. The header of claim 1, characterized in that under heat sealing conditions, the header generates lower quantities of carbon monoxide and/or VOCs compared to a header coated with a film comprising LDPE and which is mLLDPE-free.

18. The header of claim 1, wherein the coating further comprises at least one low density polyethylene (LDPE) resin.

19. The header of claim 18, wherein the coating comprises from about 10 wt % to about 40 wt % of the LDPE resin.

20. A wrapped paper roll, comprising:
- a paper roll having two spaced-apart roll ends and an outer roll surface extending between the roll ends;
- two interior headers, each one of the interior headers being affixed to one of the roll ends;
- a wrapping paper covering the outer roll surface and being crimped over the edges of the interior headers at the ends of the rolls; and
- two exterior headers, each one of the exterior headers being heat sealed to a respective interior header and corresponding to a header as defined in claim 1.

21. A method for wrapping a paper roll having a pair of spaced-apart roll ends and an outer roll surface extending between the roll ends, comprising:
- providing a wrapping paper;
- wrapping the outer roll surface with the wrapping paper, the wrapping paper extending outwardly beyond the ends of the roll;
- fitting an interior header at each one of the roll ends;
- crimping the wrapping paper over an edge of each one of the interior headers at the ends of the roll; and
- heat sealing a header as defined in claim 1 at each one of roll ends.

* * * * *